United States Patent [19]
Frantz

[11] 3,896,367
[45] July 22, 1975

[54] CIRCUIT FOR REDUCING TURN-ON AND TURN-OFF TIMES OF INDUCTIVE LOADS

[76] Inventor: Claude Frantz, Kistlerhofstrasse 143, 8000 Munich 70, Germany

[22] Filed: Mar. 1, 1974

[21] Appl. No.: 447,152

[30] Foreign Application Priority Data
Mar. 7, 1973 Germany.............................. 2311340

[52] U.S. Cl. ................ 323/6; 307/134; 317/DIG. 6
[51] Int. Cl.² ........................................ H01H 47/32
[58] Field of Search ........... 307/130, 134, 268, 270; 317/148.5 R, DIG. 4, DIG. 6; 323/6, 7, 19, 62

[56] References Cited
UNITED STATES PATENTS
| | | | |
|---|---|---|---|
| 3,143,668 | 8/1964 | Bloodworth et al. ........... | 317/DIG. 6 |
| 3,200,308 | 8/1965 | Mazgy............................ | 317/DIG. 4 |
| 3,532,961 | 10/1970 | Bramer............................ | 307/130 X |

Primary Examiner—A. D. Pellinen
Attorney, Agent, or Firm—Ernest F. Marmorek

[57] ABSTRACT

In a circuit arrangement including an inductive load having a load winding, a control circuit for reducing the turn-on or turn-off time of the inductive load, a source of electrical current supply connected in series with the load winding, a source of control pulses, a transistor connected in series with the load winding and connected to the source of control pulses, the control circuit including a control winding inductively coupled to the load winding and the load winding inducing a voltage in the control winding when the transistor is conductive, a MOS-FET device having a gate, a drain and an source electrode, an auxiliary winding inductively coupled to the load winding and to the control winding; the auxiliary winding is connected in series with the drain and source electrodes and with the source of electric potential for inducing in the load winding by the auxiliary winding an additional current when the MOS-FET is conducting, the current having a sign directed to increase the potential present in the load winding, whereby the turn-on time of the inductive load decreases.

1 Claim, 2 Drawing Figures

CIRCUIT FOR REDUCING TURN-ON AND TURN-OFF TIMES OF INDUCTIVE LOADS

FIELD OF THE INVENTION

The present invention relates to a circuit arrangement for reducing the turn-on or turn-off time of an inductive load, such as relays, electromagnetic couplings or control magnets, in which the load coil or winding of the inductive load is connected in series with the connector-emitter path of a transistor controlled by control pulses and then connected to a supply source.

BACKGROUND OF THE INVENTION

Several circuit arrangements became known which were proposed for the shortening of the turn-on time of electromagnetic couplings for control magnets. In German Pat. No. 1,088,148 a circuit is described for shortening the turn-on time of an inductive consumer or load which is supplied from a line transformer and a rectifier and in which a capacitor is loaded up to an excess voltage and then becomes discharged over the winding of the inductive load, that is, of the coupling or of the control magnet. In the same literature there is proposed for the reduction of the voltage to the nominal voltage of the load, a series capacitor for use as an input impedance in the A.C. portion of the line voltage transformer, and which preferably with the inductance of the transformer will form a resonance circuit tuned to the line frequency. Such circuit found wide applications; however, the turn-on time practically cannot be reduced to the milliseconds range, which range would be desirable in certain applications.

SUMMARY OF THE INVENTION

It is, therefore, an object of the present invention to provide a circuit arrangement for use with inductive loads which is capable of reducing the turn-on and turn-off time of such inductive loads to a low range below that of the hitherto known control circuits of this type.

It is another object of the present invention to provide a circuit arrangement for use with inductive loads to reduce the turn-on and turn-off time of such inductive loads to the low milliseconds range which hitherto was impossible with known control circuits of similar character.

According to the present invention a circuit arrangement is provided for inductive loads having a load winding to which a control winding of the present control circuit is coupled in such a manner that, when a first transistor connected in circuit relationship with the load winding becomes conductive, the control winding will have a voltage induced therein which will turn on an enhancement type MOS-FET the source-drain path of which is connected in series with an auxiliary winding and thereby connected to a supply source in such a manner that, when current starts to flow through such auxiliary winding an additional current is induced in the load winding which has a direction to aid, that is, to increase the effect of the already present current on the load winding, thereby to reduce the turn-on time of the inductive load.

It is preferred according to the present invention to include a further transistor into the source circuit of the MOS-FET which becomes conductive through the voltage induced in the control and, as a result, increasing the maximum possible current that can flow into the auxiliary winding.

BRIEF DESCRIPTION OF THE DRAWING

The invention will become readily apparent from the following description of preferred embodiments thereof shown in the accompanying drawing, in which.

DESCRIPTION OF THE PREFERRED EMBODIMENTS

Figure 1:
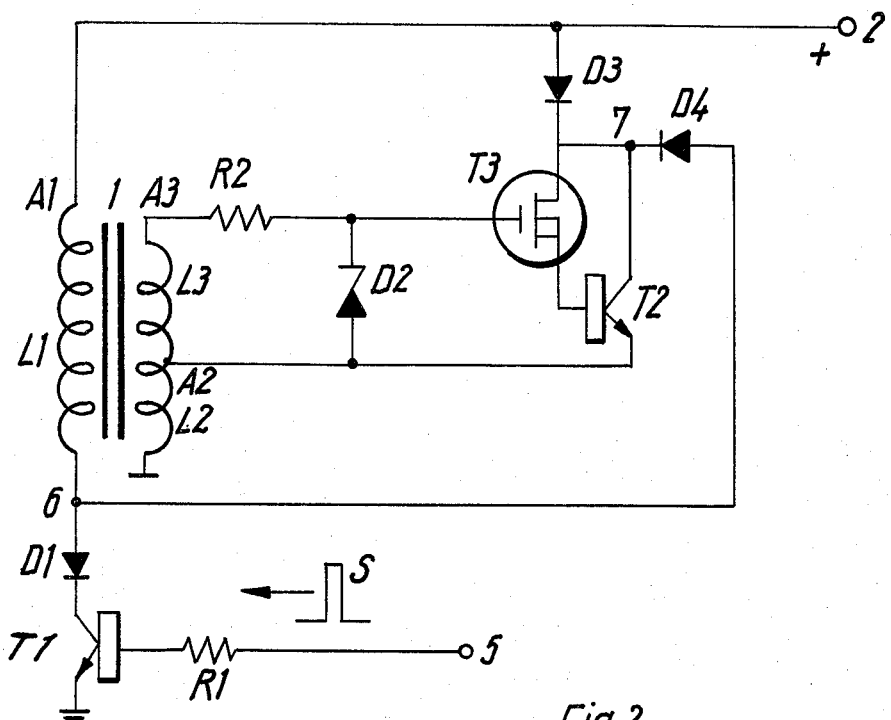
FIG. 1 illustrates a first embodiment of the control circuit coupled to the load winding of an inductive load for aiding the switching time, that is, the turn-on or turn-off time of such inductive load.

The load coil $L_1$ of an inductive load 1 which can be a relay, for example, is connected in series with a diode $D_1$ and the collector-emitter path of an NPN transistor $T_1$ between the positive terminal 2 of a current source (not shown) and a ground. It is assumed that the negative pole of the current source is likewise connected to the ground. The inductive load 1 is provided, in addition to the load coil $L_1$ of 5,000 turns, with an auxiliary coil $L_2$ of 300 turns and a control coil $L_3$ of 2,500 turns, the functions of which will be described hereinafter. The terminals of the windings $L_1$, $L_2$ and $L_3$, which are wound in the same direction, are designated as $A_1$, $A_2$ and $A_3$, respectively. One end of the winding $L_2$ is connected to the ground. The control winding $L_3$ is bridged by a Zener diode $D_2$, and a resistor $R_2$ to limit the current flow. One end of the control winding $L_3$ and a pole of the Zener diode $D_2$ are connected to the emitter of an NPN transistor $T_2$ and to the gate electrode of the MOS-FET $T_3$ which is of the enhancement type MOS-FET semiconductor device. The source of the MOS-FET $T_3$ is connected to the base of the transistor $T_2$, and the drain to two diodes $D_3$ and $D_4$ which diodes are connected in a reciprocal or opposing arrangement. The other end of the diode $D_3$ is connected to the plus terminal 2 of the current source, and the other end of the diode $D_4$ is connected to the end 6 of the load coil $L_1$ which is remote from the terminal 2. The control signals for switching on the inductive load are in the form of pulses and indicated by the pulse signal S. They are transmitted from the input 5 and the resistor $R_1$ to the base of a transistor $T_1$.

As long as there is no control signal S connected to the input 5, the transistor $T_1$ remains off and the load coil $L_1$ has no current flowing therein. There are no voltages induced across the ends of the windings of $L_2$ and $L_3$; therefore, also the MOS-FET $T_3$ and the transistor $T_2$ controlled by them are off.

If a pulse signal S is transmitted from input 5 to the base of the transistor $T_1$, then transistor $T_1$ becomes conductive and current starts flowing from the terminal 2 through the winding $L_1$, the diode $D_1$, and the transistor $T_1$. A corresponding voltage is induced in the windings $L_2$ and $L_3$.

The voltage induced in the winding $L_3$ has the effect of producing a control or firing potential on the resistor $R_2$ for the transistor $T_3$, so that current flows through the latter and acts as a control base current for the transistor $T_2$, so that transistor $T_2$ becomes conductive. The Zener diode $D_2$ limits the voltage produced by the control coil $L_3$ so that the MOS-FET $T_3$ cannot be damaged. As the transistor $T_2$ and MOS-FET $T_3$ are conductive, an auxiliary current begins to flow from the terminal 2 through the diode $D_3$ and the transistor $T_2$, over the auxiliary coil $L_2$ to the ground. As a result, a potential is induced in the load coil $L_1$, which potential effects an increase of the potential present across the load coil $L_1$ due to the aiding coupling of windings $L_1$ and $L_2$. Due to the potential increase the current rise in the load coil $L_1$ is increased and the turn-on time is shortened. During this interval there occurs at point 6 a negative potential with respect to the ground, but the diode $D_1$ prevents the conduction of this negative potential pulse to the transistor $T_1$, and thereby protects the transistor $T_1$ from damage. Simultaneously, the diode $D_1$ prevents any disturbing feedback to the pulse signal S.

The current flowing through the coil $L_2$ induces in the coil $L_3$ an additional potential which acts as additional control voltage for the MOS-FET $T_3$ and causes over the latter the conduction of the collector-emitter path of the transistor $T_2$. The current rise or rather the current change in the auxiliary coil $L_2$ eventually diminishes and thereby the potential induced by the auxiliary coil $L_2$ in the working coil $L_1$ and in the control coil $L_3$ will decrease. After a short time, usually after some microseconds, the diode $D_1$ becomes conductive again, and current flows again over the load coil $L_1$, the diode $D_1$ and the transistor $T_1$. Some microseconds later, the potential induced in the control coil $L_3$ diminishes and does not suffice to sustain the conduction of MOS-FET $T_3$ and thus of transistor $T_2$, and transistor $T_2$ and MOS-FET $T_3$ turn off, so that the coil $L_2$ has no current flow therein. The pulse induced thereby in the working coil $L_1$ and in the control coil $L_3$ is considerably dampened by the circuit elements connected to the coils mentioned.

As soon as the transistor $T_2$ and MOS-FET $T_3$ are cut-off, current flows only through the load coil $L_1$, which current through adequate dimensioning of coil $L_1$ is sufficient as a holding current for the electromagnetic coupling or relay and remains constant as long as the control signal S lasts.

As soon as the feeding of a control pulse signal S is interrupted or the duration of the pulse signal S ends, the transistor $T_1$ turns off and no more current flows in the load coil $L_1$. The excess voltage induced by this current change is considerably dampened by the existing circuit elements. The potential induced in the control coil $L_3$ is limited by the resistor $R_2$ and the Zener diode $D_2$, because the anode of the latter is brought to a positive potential and thus the diode $D_2$ breaks down. By the voltage induced in the auxiliary coil $L_2$, the emitter of the transistor $T_2$ becomes negative with respect to the ground and by the voltage induced in the working coil $L_1$ the nodal point 7 becomes positive with respect to the ground. Therefore, the diode $D_4$ becomes conductive and transfers the positive potential to the collector of the transistor $T_2$. As the positive potential over the diode $D_4$ also reaches the anode of the MOS-FET $T_3$, the latter becomes conductive along with the transistor $T_2$ controlled by the MOS-FET $T_3$, whereby a strong dampening is effected during turn-off. There develops a current flow from the terminal 2 over the working coil $L_1$, the diode $D_4$, the transistor $T_2$ and the auxiliary coil $L_2$.

According to experience, the structural elements, especially the transistor $T_2$, can be dimensioned in such a manner that there is no reason to expect any damage to it.

If, after the ringing off of the excess or transient voltage which was induced during the disconnecting process, the excess voltage is not strong enough to render the transistor $T_3$ conductive without a signal to the gate electrode, then both transistor $T_2$ and MOS-FET $T_3$ are cut-off. The dampening is terminated and the dampened oscillation process, the first half period of which was the transient voltage, continues in the coil. Now, however, the amplitude is so small that no damage can occur to the circuit elements.

By the hereinabove described circuit not only the turn-on time is considerably shortened, for instance from about 10 msec to 2½ msec, but also the turn-off time is shortened from about 15 msec to about 2½ msec without damage to the circuit elements.

Figure 2:
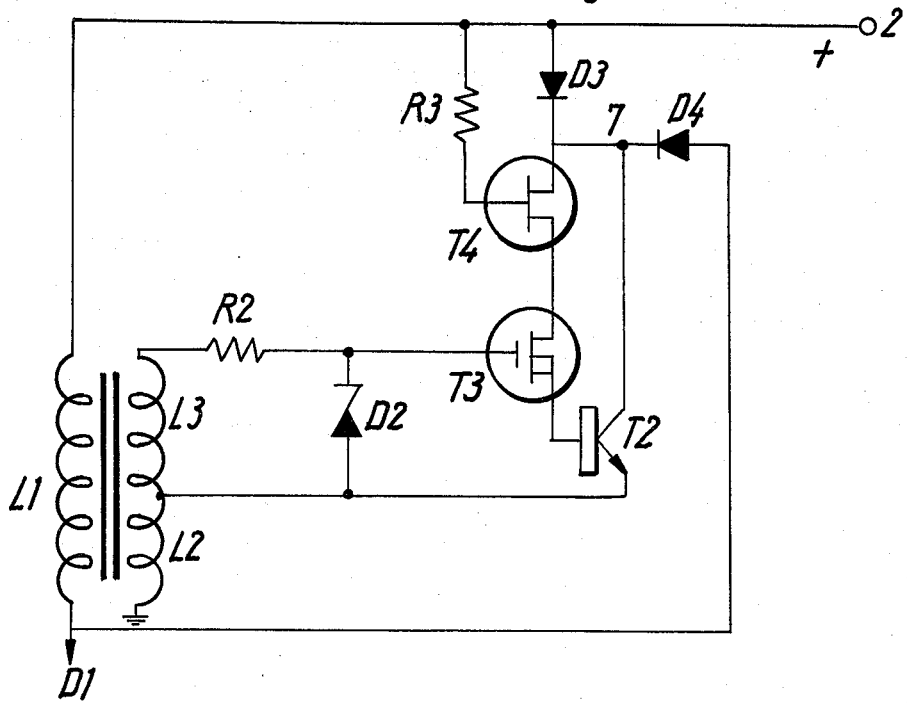
FIG. 2 is a similar illustration as FIG. 1 of a second embodiment of the control circuit according to the present invention.

FIG. 2 illustrates a modification of the circuit arrangement of FIG. 1, which is useful in some cases. Here a so-called N-channel-field-effect transistor $T_4$ is connected to the drain electrode of the MOS-FET $T_3$ in such a manner that the drain electrodes of both FET and MOS-FET are joined. The gate electrode of the transistor $T_4$ is connected over a resistor $R_3$ in such a way that the FET $T_4$ is conductive in its normal state. FET $T_4$ is turned-off only when during the turn-off of the current flowing through the working coil $L_1$, a positive pulse reaches through the diode $D_4$ the source of the FET $T_4$. As a result, the base electrode of the FET $T_4$ becomes negative with respect to the source electrode and the FET $T_4$ is turned-off during this period. The FET $T_4$ would become conductive again only when the voltage across it exceeds a threshold voltage and which can render it conductive without a firing signal. This control arrangement is especially advantageously applied in those cases where the working voltage provided to feed the inductive load 1 and supplied to line 2 is so high that the transistor $T_3$ would be damaged thereby.

Otherwise the switching circuit in FIG. 2 works the same way as that according to FIG. 1. For the sake of simplicity and clarity, the diode $D_1$, the transistor $T_1$, the resistor $R_1$, as well as the line 5, are omitted in FIG. 2.

The circuit according to the invention was described above for the use with a positive supply voltage with respect to the ground. Naturally, it is also possible in choosing the respective circuit elements, for instance PNP-transistors instead of NPN-transistors, to attain the same result with an oppositely poled supply voltage with respect to the ground.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A circuit for obtaining a reduced turn-on or turn-off of an inductive load, said circuit comprising, in combination:
   a first transistor having a collector, an emitter, and a base and operative to be conductive for a pulse signal applied to its base;
   a first diode connected to the collector of said first transistor and operative to be conductive when said first transistor is conductive;

said inductive load including a load winding and a control winding inductively coupled to said load winding;

first connecting means connecting said first diode in series connection with one end of said load winding;

a voltage supply means connected in series with the other end of said load winding;

a pulse signal source connected to the base of said first transistor and operative to make said first transistor conductive;

a MOS-FET having gate, source and drain electrodes and having its gate coupled to one end of said control windings;

a second transistor having a collector, an emitter, and a base and connected to said MOS-FET in a Darlington connection and connected to the other end of said control winding, whereby said MOS-FET becomes conductive when said first transistor is conductive;

an auxiliary winding inductively coupled to said load winding and said control winding and connected at one end to said second transistor and operative for increasing the current flow in said load winding when said MOS-FET is conductive;

a second diode conductively connecting said voltage supply means to said MOS-FET;

a third diode conductively connected with the other of said load winding to said MOS-FET;

the winding ratio of said load winding to said auxiliary winding being selected for turning on said MOS-FET by the voltage induced in said auxiliary winding by the current flowing in said load winding, during the turning off of said current and to terminate the conduction when said induced transient current is substantially zero;

said auxiliary winding being operative for increasing the current flow in said load winding when said MOS-FET is conductive, whereby the turn-on time of said inductive load is substantially decreased with respect to the normal time.

* * * * *